Dec. 7, 1954     W. T. GAFFORD     2,696,370
SODA FOUNTAIN MIXER
Filed May 5, 1952
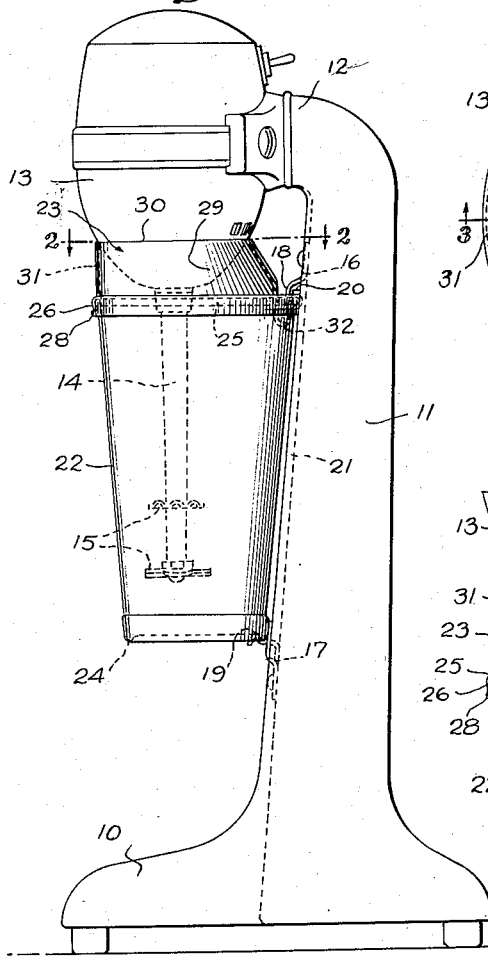
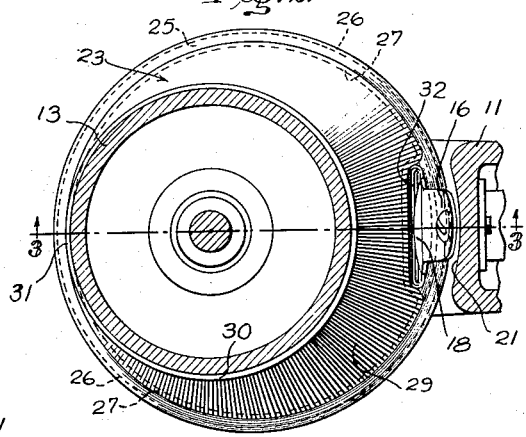
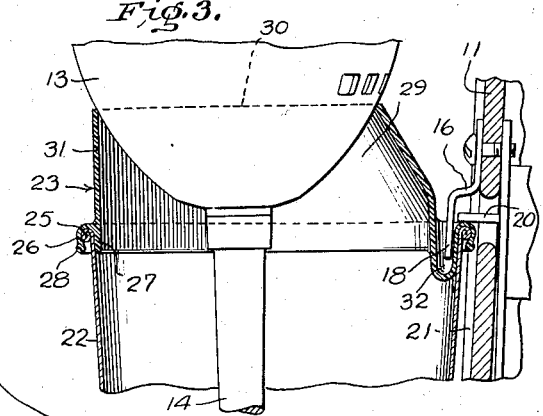
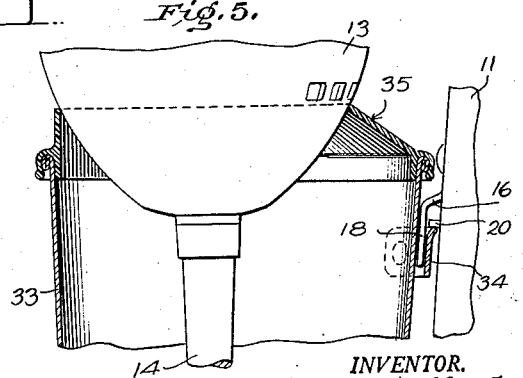
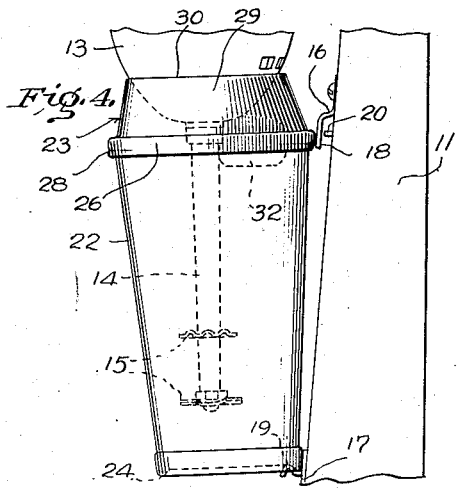
INVENTOR.
William T. Gafford
BY Reginald W. Hoagland
ATTORNEY

United States Patent Office 2,696,370
Patented Dec. 7, 1954

2,696,370

SODA FOUNTAIN MIXER

William T. Gafford, Flint, Mich., assignor of one-half to Gerhardt C. Ver Wiebe, Genesee County, Mich.

Application May 5, 1952, Serial No. 286,111

5 Claims. (Cl. 259—108)

This invention relates to soda fountain mixers and, more particularly, to mixers having sanitary and anti-splash arrangements for closing off the interior of the removable mixing cup and the agitator, both during use and non-use of the mixer.

The main object of the invention is to provide a novel and improved mixer of this character having a mixing cup of sufficient height to extend upwardly and engage around the housing of the motor of the mixer and, together with said motor, to form a closure for the cup.

Another object of the invention is to provide a mixing cup as outlined above wherein said engagement of the cup with the motor will aid in supporting the cup on the mixer during operation of the mixer and will form an upper support for the cup to permit placing the cup on the mixer in a position out of engagement with the normal upper cup supporting element and motor switch, and will also close off the interior of the cup and the agitator when the mixer is not in operation.

A further object of the invention is the provision of a mixing cup as set forth above constructed wholly or partially of non-metallic and semi-resilient material that yieldably engages the housing of the motor for permitting the cup to be elevated to a position to engage over the lower cup supporting element of the mixer and for eliminating metallic contact of the cup with the motor.

A still further object of the invention is to provide an attachment for mixing cups now in use that forms an upward extension which accomplishes the above-specified purposes and that is provided with a depending pocket therein for reception of the upper cup supporting element during operation of the mixer.

An additional object of the invention resides in the provision of a mixing cup for mixers of the above-indicated character which is simple and substantial in construction, which may be manufactured and placed on the market at a minimum cost, and which is thoroughly efficient and practical in use.

With the above and other objects and advantages in view, the invention consists of combinations and general assemblage to be hereinafter enlarged upon and pointed out in the appended claims.

The invention is illustrated in the accompanying drawings, wherein:

Figure 1 is a side elevation of a mixer with the improved mixing cup shown as being constructed as an attachment to the usual mixing cup;

Figure 2 is a horizontal section taken on line 2—2 of Figure 1;

Figure 3 is a vertical section taken on line 3—3 of Figure 2 with parts broken away;

Figure 4 is a fragmentary elevation similar to Figure 1, showing the cup supported on the mixer when the mixer is not in operation; and Figure 5 is a sectional view similar to Figure 3, showing a slightly modified form of the invention.

The soda fountain mixer illustrated may be taken as conventional or typical and embodies a base 10 from which extends upwardly and slightly rearwardly a standard 11 that has attached to a forwardly projecting upper end 12 thereof a housing 13 of an electric motor. Extending downwardly from the motor housing 13 in advance of the standard 11 is a vertically arranged rotatable stem 14 with agitators 15 thereon. On the forward face of the standard 11 are secured upper and lower cup supporting elements 16 and 17, respectively. The upper element 16 has a downwardly projecting clip 18 spaced from the standard and adapted to engage inside the rim of the mixing cup, while the lower element 17 has a raised ledge 19 on a forwardly directed leg thereof over which an annular flanged bottom of the mixing cup engages. A spring-returned, switch-actuating finger 20 projects through an opening in the forward wall of the standard 11 behind the clip 18 and is in the path of movement of the rim of the cup when the cup is inserted under the clip 18 for swinging said finger upwardly against tension of its spring to close a circuit to the motor when the cup is supported on the standard 11 and under the clip 18. The forward surface of the forward wall of the standard 11 is arced inwardly, as at 21, and conforms substantially to the curvature of the cylindrical wall of the normal mixing cup.

The improved mixing cup and its construction in combination with the above-described type of mixer which forms the subject of the present invention is illustrated as consisting of the usual metallic mixing cup 22 with a semi-resilient ring-shaped member 23 attached thereto and extending upwardly therefrom. Because of the manner of support of the mixing cup on the mixer, method of retaining the ring-shaped member 23 on the metallic cup portion 22, and the fact that the ring-shaped member 23 must yieldably engage the motor housing 13, it is desired that the material from which said ring-shaped member is constructed be resilient to a limited degree, and it has been found that polyethylene, a form of plastic, is highly suitable for the purpose.

The metallic lower portion 22 of the cup has the customary above-mentioned annular flange 24 projecting downwardly from its bottom and has the usual outwardly rolled edge 25 at its upper and normally open end. Engaging around the rolled edge 25 and the adjacent inner surface of the cup portion 22 is a pair of downwardly extending annular flanges 26 and 27, respectively, formed as parts of the ring-shaped member 23. At the lower edge of the outer flange 26 a slight enlargement is provided in the form of an annular bead 28 for strengthening the elasticity of such portion of the flange to cause a closing in of the flange under the rolled edge 25 and thus prevent accidental displacement of the ring-shaped member 23 from the metallic cup portion 22.

Extending upwardly and forming a continuation of the inner flange 27 is a circular wall 29 that tapers inwardly as it extends upwardly and terminates at its upper edge 30 in a perfect circle that is forwardly offset relative to the larger circle formed at said flange and thereby provides a substantially vertical forward wall portion 31 from which said circular wall gradually decrease in inclination as it extends rearwardly. The circular upper edge 30 is arranged substantially parallel to the annular flanges 26 and 27 and is offset forwardly to effect an engagement thereof around the motor housing 13 upon supporting of the mixing cup on the standard 11.

At the rear of the ring-shaped member 23 directly opposite the vertical wall portion 31 a downwardly directed pocket 32 is provided which extends into the lower metallic cup portion by uniting the lower ends and sides of downward extensions formed on the inner flange 27 and the circular wall 29. The pocket 32 is of a length and depth for adequately and conveniently receiving the downwardly projecting clip 18 of the upper cup supporting element 16 when supporting the cup in the position effecting operation of the mixer, as shown in Figures 1, 2, and 3.

To place the mixing cup on the mixer for operation of the mixer, said cup is moved upwardly around the agitators 15, engaging the clip 18 into the pocket 32 and engaging the upper circular edge 30 of the resilient ring-shaped member with the motor housing 13 until the annular flange 24 on the bottom of the cup can be engaged over the raised ledge 19 of the lower cup supporting element 17. Upon lowering the cup over the ledge 19, said resilient upper edge, which was sprung outwardly by upward movement of the cup, closes tightly around the motor housing and, due to the convex shape of the housing and location of engagement therewith, aids in holding the cup in its downward position on the lower supporting element 17. Instead of the rolled edge 26 of the metallic cup portion 22 engaging the finger 20 of the electric switch to close an electric circuit to the motor, the material of the ring-shaped member around the rolled edge and joining the flanges 26 and 27, which is relatively thin at such location, contacts and actuates said switch finger. Thus, it can be seen that the ring-shaped member and the lower portion of the motor housing combine to provide a complete closure for the cup to prevent splashing of ingredients from the cup and to keep all foreign matter from entering the cup while mixing a drink.

For closing off the interior of the cup and at the same time enclosing the agitators 15 and stem 14 to prevent winged insects, dust, and other small particles of foreign matter circulating thereabout from contacting such parts when the mixer is not in operation, the cup may be supported on the mixer in the manner illustrated in Figure 4. In this case, the cup is slightly turned relative to the mixer with the clip 18 out of engagement in the pocket 32. Such a position is possible because the circle formed by the upper edge 30 of the ring-shaped member which engages the motor housing is eccentric to the circles formed by the cup proper.

In Figure 5 is shown a slightly modified form of the invention wherein a metallic cup portion 33 of greater height is employed, and instead of the clip 18 of the upper supporting element projecting into the cup, said clip engages under a U-shaped bracket 34 which is riveted or otherwise secured to the outside of the cup and which actuates the switch finger 20. This construction eliminates the need of a pocket for the clip when completely sealing off the interior of the cup and materially reduces the height of the ring-shaped member designated generally by the numeral 35.

While embodiments of the invention are shown as being constructed of metallic and resilient parts, it is to be understood that the entire cup or other parts thereof not designated may be constructed of semi-resilient material which is capable of a limited degree of yieldment without permanent deformation or rupture thereto. Further, the constructional forms above-described and illustrated in the drawings are to be regarded as examples only, and the details may be modified in several ways without departing from the spirit of the invention.

What is claimed is:

1. A soda fountain mixer comprising a vertical standard, a motor supported by and forwardly of said standard, an agitator driven by and extending downwardly from said motor in front of said standard, a lower mixing cup supporting member on said standard, and a substantially cylindrical mixing cup removably engaging over said lower supporting member with said agitator extending downwardly therein, said cup having at least the upper open end portion thereof semi-resilient and adapted to yieldably engage around the housing of said motor, said mixing cup being removably supported in said position by said lower supporting element and by engagement of the upper open end thereof with said motor housing.

2. In combination with a soda fountain mixer including a vertical standard, a motor supported by and forwardly of said standard, an agitator driven by and extending downwardly from said motor in front of said standard, and a mixing cup removably supported on said standard beneath said motor and into which said agitator extends; a closure for the normally open end of said cup comprising a ring-shaped member retained on and bodily carried by the open end of the cup and adapted to removably engage around the housing of the motor and thereby close off the interior of the cup when said cup and closure are supported by said standard, said cup and said ring-shaped member bodily carried thereby being removable as a single unit from the remainder of said mixer.

3. In combination with a soda fountain mixer including a vertical standard, a motor supported by and forwardly of said standard, an agitator driven by and extending downwardly from said motor in front of said standard, an upper mixing cup supporting element on said standard, a lower mixing cup supporting element on said standard, and a substantially cylindrical mixing cup removably supported on said standard with said agitator extending downwardly therein, said mixing cup being supported by engagement of said upper supporting element therein and by said lower supporting element therebeneath; a closure for the normally open end of said cup comprising a circular wall carried by and in sealing engagement with the circular edge of the open end of the cup and adapted to removably engage around the housing of said motor and thereby close off the interior of the cup when said cup is supported on said standard, said circular wall having a pocket formed therein projecting downwardly into said cup and into which said upper mixing cup supporting element extends.

4. In combination with a soda fountain mixer including a vertical standard, a motor supported by and forwardly of said standard, an agitator driven by and extending downwardly from said motor in front of said standard, an upper mixing cup supporting element on said standard, a lower mixing cup supporting element on said standard, and a substantially cylindrical mixing cup removably supported on said standard by engagement of said upper and lower supporting elements therewith, said cup being slightly inward of alignment with said motor when supported by said upper and lower supporting elements and having said agitator extending downwardly therein; a closure for the normally open end of said cup comprising a circular wall carried by the cup and with the lower portion thereof in sealing engagement with the circular edge of the open end of the cup and with the circular upper portion forwardly of the center line of the cup and adapted to removably engage around the housing of said motor and thereby close off the interior of the cup when said cup is supported on said standard, said cup also being supportable by said lower supporting element and engagement of the circular wall with the motor housing upon turning of said cup to disalign said upper supporting element from engagement with said cup.

5. In combination with a soda fountain mixer including a vertical standard, a motor supported by and forwardly of said standard, an agitator driven by and extending downwardly from said motor in front of said standard, an upper mixing cup supporting element on said standard, a lower mixing cup supporting element on said standard, and a substantially cylindrical mixing cup removably supported on said standard by engagement of said upper supporting element therein and said lower supporting element therebeneath, said cup being slightly inward of alignment with said motor when supported by said upper and lower supporting elements and having said agitator extending downwardly therein; a closure for the normally open end of said cup comprising a circular wall carried by the cup and with the lower portion thereof in sealing engagement with the circular edge of the open end of the cup and with the circular upper portion forwardly of the center line of the cup and adapted to removably engage around the housing of said motor and thereby close off the interior of the cup when said cup is supported by both of said supporting elements on said standard, said circular wall having a pocket formed therein projecting downwardly into said cup and into which said upper mixing cup supporting element extends, said cup also being supportable by said lower supporting element and engagement of the circular wall with the motor housing upon turning of said cup to disalign said upper supporting element with said pocket.

References Cited in the file of this patent

UNITED STATES PATENTS

| Number | Name | Date |
|---|---|---|
| 1,085,858 | Fulton | Feb. 3, 1914 |
| 1,233,823 | Tiger et al. | July 17, 1917 |
| 2,131,190 | Prince | Sept. 27, 1938 |
| 2,193,356 | Green | Mar. 12, 1940 |